Dec. 16, 1941.  S. E. SHEA  2,266,088
ALTERNATING CURRENT MOTOR
Filed Aug. 7, 1939  2 Sheets-Sheet 1

INVENTOR
Samuel E. Shea
BY George A. Gillette, Jr.
ATTORNEYS

Dec. 16, 1941.   S. E. SHEA   2,266,088
ALTERNATING CURRENT MOTOR
Filed Aug. 7, 1939   2 Sheets-Sheet 2

INVENTOR
Samuel E. Shea
BY George A. Gillette, Jr.
ATTORNEYS

Patented Dec. 16, 1941

2,266,088

UNITED STATES PATENT OFFICE 2,266,088

ALTERNATING CURRENT MOTOR

Samuel E. Shea, Buffalo, N. Y., assignor to F. A. Smith Manufacturing Company, Rochester, N. Y.

Application August 7, 1939, Serial No. 288,725

6 Claims. (Cl. 172—278)

The present invention relates to an alternating current motor and more particularly to a single phase alternating current motor of high starting torque and good operating characteristics.

Single phase motors of the induction type, as such, have no starting torque and shading means for displacing a component of the flux at the poles must be used. Such shaded pole or split phase induction type motors are relatively slow in attaining their normal or synchronous speed, even under no load conditions.

The primary object of the present invention is the provision of an alternating current motor with shaded poles and having on each pole a pair of windings which are arranged to give a greater flux density in said poles during starting than when said windings are connected in series to the same supply of electrical energy.

A further object of the invention is to provide a shaded pole alternating current motor having on each pole a pair of windings, one winding of each pair being connected in series to a source of electrical energy for development of a high starting torque, and all the windings of said pairs being connected in series to the same supply of energy during running to provide a motor with good operating characteristics.

Another object is an alternating current motor with shaded poles having on each pole a pair of windings which are first temporarily connected by a switch means to a supply of energy to produce a high flux density in said poles and which are then connected by said switch means in series to said supply of energy to produce a lower flux density in said poles for continuous running conditions.

Other and further objects of the invention will be apparent to those skilled in the art from the description which follows.

The aforementioned objects of the invention are embodied in an alternating current motor having shaded poles and having a pair of windings or coils on each pole, said windings or coils being proportioned and arranged to produce a greater flux density in said poles when at least one of them is connected during starting to a supply of electrical energy than when said pair of windings is connected in series to the same supply of electrical energy. A manually or automatically operated switch means is arranged to first connect at least one of said windings to the supply of energy to produce said greater flux density in the poles and a high starting torque in the armature and then to connect said pair of windings in series for improved running or operating conditions for said motor.

Reference is hereby made to the accompanying drawings wherein like reference characters designate similar elements and wherein.

Figure 1:
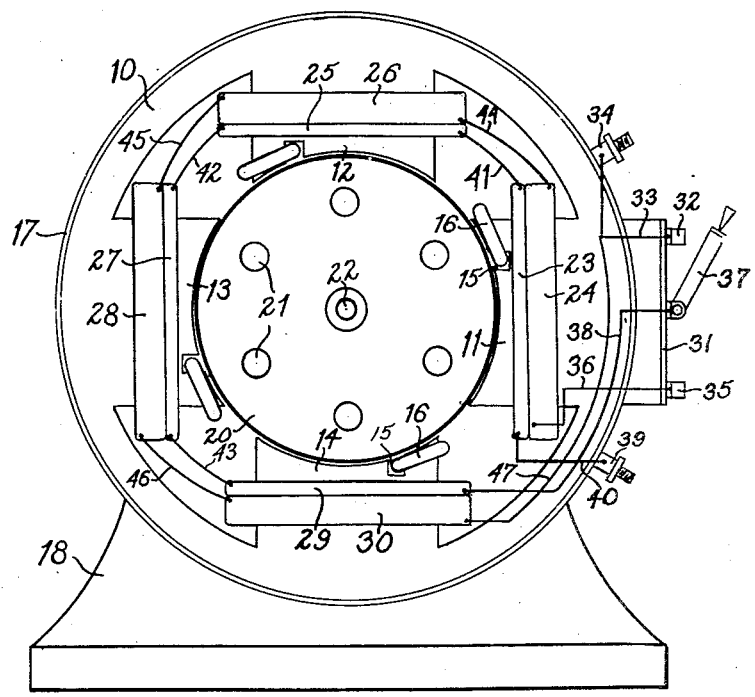
Fig. 1 is an end elevation of an alternating current motor according to the invention with the end cap of the motor housing removed for better illustration of the internal parts.

The features of the invention are illustrated in the drawings as being embodied in a four pole single phase motor, however, it is understood that any even number of poles may be used on the primary or field member. Also the displacement of a component of flux for starting is obtained by shading bands.

The field or primary member comprises a laminated frame 10 having inwardly extending poles 11, 12, 13, and 14, each of which is provided with a slot 15 in which shading bands 16 are mounted. The motor housing 17 surrounds said laminated frame 10, has a base portion 18, and has its ends enclosed by end caps 19.

The secondary or armature member of the motor is preferably a rotor of the squirrel cage type and may be composed of a plurality of laminated discs 20 in which a plurality of bars 21 are imbedded, these bars being short-circuited in the conventional manner by end rings. Said discs 20 are mounted upon a shaft 22 which is journaled in the end caps 19 of the motor housing so that the rotor is relatively rotatable with respect to the poles of said field member in the usual fashion.

According to the present invention, the field windings of the motor are first connected so as to produce a high flux density in the poles and to create a high starting torque in the rotor.

Figure 2:
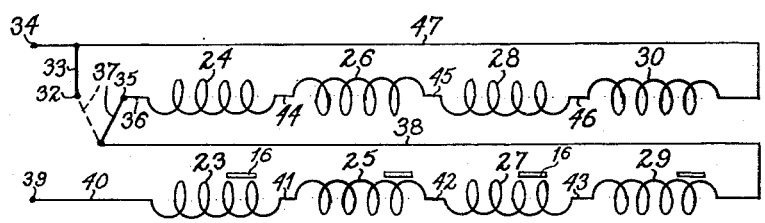
Fig. 2 is a wiring diagram of the preferred circuits through the windings of the motor shown in Fig. 1.

The preferred manner of providing and connecting such field windings is illustrated in Figs. 1 and 2. A pair of windings, including a starting winding 23 and a running winding 24, surround pole 11. Similarly, starting winding 25 and running winding 26 encircle pole 12, starting winding 27 and running winding 28 encircle pole 13, and starting winding 29 and running winding 30 encircle pole 14.

Said starting windings 23, 25, 27 and 29 are connected in series to a supply of single phase electrical energy and are designed to carry a relatively large amperage current, at least for a short time, so that the ampere turns in the windings and flux density in the poles will be correspondingly high. On the other hand, the running windings 24, 26, 28 and 30 are also connected in series with each other and in series with said starting windings and are designed to reduce, under running conditions, the field excitation current below that in the starting windings alone and to reduce the ampere turns in the windings and the flux density in the poles below that employed for starting.

The change over from starting to running conditions may be accomplished by a manually operated switch means. Such a switch means comprises a single pole double throw switch 31 mounted on motor housing 17, having one contact clip 32 connected by a wire 33 to a binding post 34 also on housing 17, having a second contact clip 35 connected by a wire 36 to one side of running winding 24, and having a switch arm 37 which is connected by a wire 38 to one side of starting winding 23.

In starting position of the switch means, switch arm 37 is in contact with contact clip 32 and the starting circuit through the motor is as follows: from binding post 39, wire 40, starting winding 23, wire 41, starting winding 25, wire 42, starting winding 27, wire 43, starting winding 29, wire 38, switch arm 37, contact clip 32, wire 33, and binding post 34. The starting position of switch arm 37 is indicated by the dotted line in Fig. 2 and the starting circuit may be readily traced on the wiring diagram of Fig. 2. The flux produced in the poles 11, 12, 13, and 14 will have a component thereof displaced in a well known manner by the shading bands 16 to exert a starting force on the rotor which is accordingly caused to rotate.

After the motor has attained normal speed, the switch means is thrown to running position, switch arm 37 is in contact with contact clip 35 and the circuit is now through the starting windings as before to switch arm 37 but now passes from contact clip 35, wire 36, running winding 24, wire 44, running winding 26, wire 45, running winding 28, wire 46, running winding 30, wire 47 to binding post 34. Such running circuit is shown by the full line position of switch arm 37 in Fig. 2.

The switch means may also be automatically changed from starting to running position and such automatic switch means may be of the speed responsive type disclosed in Fig. 4 or may be of a thermal responsive type including a dished bi-metallic member such as disclosed in Spencer United States Patent No. 1,448,240 granted March 13, 1923, however, the speed responsive type of automatic switch is preferred and one form thereof will now be described in connection with Fig. 4.

As before the motor comprises a laminated frame 10 having four poles, of which only poles 12 and 14 are shown. The rotor shaft 22 is journaled in the bearings of the end caps 19 of the housing 17 and carries a plurality of laminated discs 20 which are provided with slots 20' for the conventional squirrel cage winding, not shown. A pair of windings surround each of said poles, one winding of each pair being a starting winding and the other a running winding, only starting windings 23, 25 and 29 and running windings 24, 26 and 30 being shown in Fig. 4.

One leg 48 of the alternating current supply is connected to starting winding 23 which is connected to starting winding 25 by the wire 41. The starting circuit is completed through wire 42, starting winding 27, and wire 43, not shown in Fig. 4, and then through wire 49, switch arm 50, contacts 51 and 52 to the other leg of the energy supply.

The speed responsive means preferably comprises a centrifugally operated switch means and may comprise a collar 54 attached to shaft 22, a collar 55 and insulating disc 56 slidable on shaft 22, a coil spring 57 encircling shaft 22 and normally separating collars 54 and 55, two pairs of arms 58 and 59 pivoted respectively to collars 54 and 55 and to each other, and weights 60 on arms 59. The switch means comprises a switch arm 50 pivoted to a bracket 61 on end cap 19, having a bifurcated end 62 loosely engaging opposite sides of insulating disc 56, and carrying a pair of contacts 51 and 63. An off-center spring 64 is attached at one end to a pin 65 on switch arm 50 and at the other end to a post 66 on end cap 19 to give a snap action to said switch arm 50. A bracket 67 carries a contact 68 for engaging contact 63 on switch arm 50. A wire 69 leads from contact 68 to running winding 24.

Figure 4:
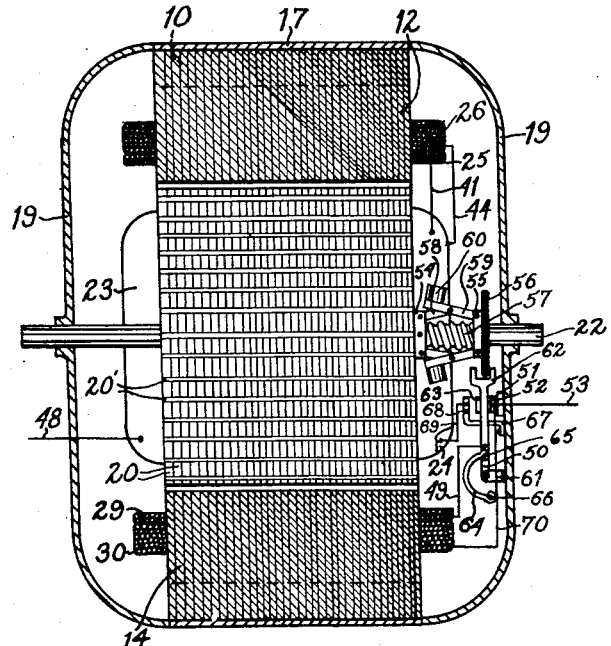
Fig. 4 is a vertical section taken through a motor as shown in Fig. 1 but equipped with an automatic switch means.

The coil spring 57 of the speed responsive means predominates over the off-center spring 64 so that when the motor is at rest the switch arm 50 is in the position shown in Fig. 4 with contacts 51 and 52 closed. The starting circuit is completed as previously described and as the motor comes up to normal speed the weights 60 move outwardly and draw collar 55 and disc 56 toward collar 54 overcoming the resistance of spring 57. The spacing between the prongs of the bifurcated end 62 and with respect to disc 56 determines the increase in speed of the motor or movement of the disc 56 which is necessary to move switch arm 50 enough to be snapped into the other position by said spring 64. After the predetermined rotor speed has been attained, switch arm 50 will be moved so that contact 63 makes with contact 68 and the circuit from starting coil 29 now passes through wire 49, switch arm 50, contacts 63 and 68, wire 69, running winding 24, wire 44, running winding 26, through wires and a running winding not shown, running winding 30, wire 70, contact 52 to the other leg 53 of the single phase energy supply.

It must be clearly understood that the starting windings are designed to pass a relatively high current for a short time to produce a relatively large number of ampere turns. This result could otherwise be obtained by having an energy supply of three or four times the normal voltage which is not convenient. Although the starting and running windings are shown as separate coils, it is obvious that such windings may both be part of a larger winding having an intermediate tap. By way of example only, satisfactory windings for a small fractional horsepower motor for use on 110 volts may be obtained by making a single winding of 190 turns of No. 21 B & S gauge wire with an intermediate tap taken off to give a starting winding with 90 turns and a running winding with 100 turns.

While in the preferred form of the invention, illustrated in Figs. 1 and 2, the starting windings 23, 25, 27 and 29 are consecutively connected in series and the running windings 24, 26, 28 and 30 are also consecutively connected in series and in series with said starting windings, the running windings may be connected into series relation alternately between said starting windings. This variation of the circuits, shown in Fig. 3, introduces some complication of the wiring and of the switch means but is otherwise satisfactory. A four pole double throw switch 71 has switch arms 72, 73, 74 and 75 which in starting position of the switch are in contact respectively with switch contacts 76, 77, 78 and 79 one each at one end of the starting windings 23, 25, 27 and 29. Wires 80, 81, 82 and 83 respectively are connected from said switch contacts 76, 77, 78 and 79 to one end of each of the running windings 24, 26, 28 and 30 which have their other ends connected to the other switch contacts 84, 85, 86 and 87 of said four pole double throw switch 71.

Figure 3:
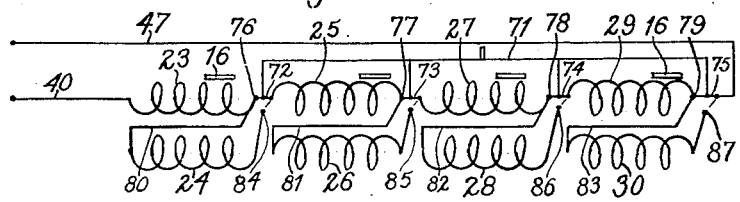
Fig. 3 is a wiring diagram of modified circuits for the motor windings according to the invention.

According to the form of the invention shown in Fig. 3, the starting circuit extends from one leg of the supply of electrical energy, through wire 40, starting winding 23, switch arm 72, starting winding 25, switch arm 73, starting winding 27, switch arm 74, starting winding 29, switch arm 75, wire 47 to the other side of the single phase supply. After the motor has attained sufficient speed by virtue of the high starting torque created by said starting windings, the switch 71 is thrown to running position with switch arms 72, 73, 74 and 75 in the positions indicated by the dotted lines in Fig. 3 and in contact with switch contacts 84, 85, 86 and 87, respectively. The running circuit then extends through wire 40, starting winding 23, wire 80, running winding 24, switch arm 72, starting winding 25, wire 81, running winding 26, switch arm 73, starting winding 27, wire 82, running winding 28, switch arm 74, starting winding 29, wire 83, running winding 30, switch arm 75 and wire 47.

Figure 5:
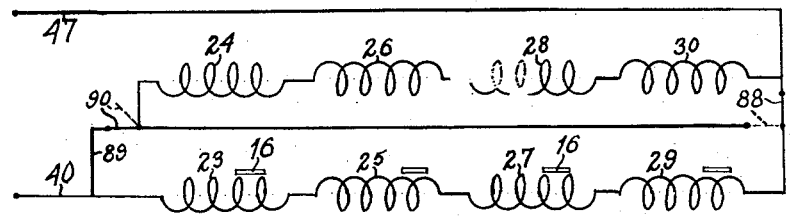
Fig. 5 is a wiring diagram of a series-parallel arrangement of the windings for starting and series connection of the windings for normal running of the motor.

Another very effective manner of realizing the present invention is to connect the pairs of windings in series-parallel across the supply line as illustrated in Fig. 5. The pairs of windings 23 and 24, 25 and 26, 27 and 28, 29 and 30, are mounted in regular fashion to encircle the respective poles of the field member. One winding of each pair, such as windings 23, 25, 27 and 29 are connected in series between the wires 40 and 47 leading to the opposite legs of the single phase supply and this circuit is completed through a switch arm 88. The other windings of each pair, such as windings 24, 26, 28 and 30 are also connected in series between wires 40 and 47 by a lead 89 and a second switch arm 90. As a result, the series of windings 23, 25, 27 and 29 are in parallel with windings 24, 26, 28 and 30 when the switch arms 88 and 90 are in closed or starting position. Under these starting conditions the ampere turns produced by these series of windings connected in parallel across the supply line are considerably greater than when the two series of windings are placed in series with each other across the same line for continuous running of the motor. After the motor has attained its desired speed, the switches 88 and 90 are opened to the dotted line positions shown in Fig. 5 and said two series of windings are placed in series with each other whereby the current in the windings is reduced to a safer value and the flux density in the poles corresponds to that required for continuous operation.

Figure 6:
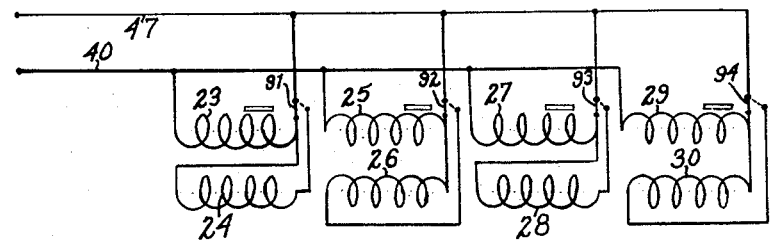
Fig. 6 is a wiring diagram of a parallel arrangement of the field for starting and of a series-parallel arrangement of said windings for normal running of said motor.

Still further the increased ampere turns and flux density may be obtained by connecting the starting windings 23, 25, 27 and 29 in parallel across the supply line and respectively through the single pole double throw switches 91, 92, 93 and 94 shown in Fig. 6. Again after the motor has come up to speed rapidly under the influence of the high flux density so produced, the switches 91, 92, 93 and 94 are thrown to the running positions indicated by the dotted lines in Fig. 6. As a result each of the pairs of starting and running windings 23 and 24, 25 and 26, 27 and 28, and 29 and 30 are connected in series with each other across the supply line or wires 40 and 47 while each pair of windings so connected in series is also in parallel with the other pairs of windings across said supply line.

It is now apparent that the principal feature of the invention is the arrangement of the field windings so that a greater flux density is produced in the poles during starting of the motor to create an unusually high starting torque and to cause rapid acceleration of the rotor up to normal speed. Such arrangement of said windings may be accomplished by designing them to give more ampere turns either on account of a high amperage excitation current or a large number of turns in the winding, or both. It will also be understood that the preferred arrangement of the windings is to place a pair of windings on each pole although it has also been indicated that a two-part winding or a winding with an intermediate tap may also be used. Furthermore, the disclosure of the invention has referred to the windings of each pair or the two-part winding as both being formed of the same size wire, however, it is obvious different sizes of wire may be used in the various windings according to existing conditions and those skilled in the art can readily determine the number of turns and sizes of wire required to produce the proportioning of the coils according to the invention so as to produce more flux in the poles when the windings are connected to the supply of energy for starting than when the windings are placed in series across the same supply line during running.

In many instances in this specification one winding of the pair of windings has been called a starting winding whereas the winding is also in the circuit and functions as a field winding during running of the motor. The purpose of this terminology is obvious because the windings so characterized function alone during starting of the motor. However, such use of the term "starting winding" is not to be construed to mean that the winding is energized only during starting because as fully explained such starting windings are in all cases connected in series with the so-called running windings for normal operation of the motor.

The present invention is susceptible to other variations which will occur to those skilled in the art, hence the present disclosure is to be construed in an illustrative sense. The spirit and scope of the invention are defined in the claims which follow.

Having now particularly described my invention what I desire to secure by Letters Patent of the United States and what I claim is:

1. An alternating current motor comprising a field member having poles, an armature member mounted for relative rotation with respect thereto, shading coils on said poles for at all times displacing a component of flux therein, a pair of windings encircling each pole, and connecting means for connecting during starting of said motor at least one winding of each pair to a supply of electrical energy and then during normal running of said motor connecting the windings of each pair in series to the same supply of electrical energy, said windings of each pair being adapted and arranged to create in the respective poles more flux during starting than is created therein during normal running.

2. An alternating current motor comprising a field member having poles, an armature member mounted for rotation relative thereto, shading coils encircling portions of said poles for at all times displacing a component of the flux therein, a pair of windings encircling each pole, and proportioned so that one winding of a pair alone creates more flux in the respective pole than when the two windings of that pair are connected in series to the same supply of electrical energy, and a switch means having a starting position and a running position, for connecting in starting position said one winding of each of the several pairs in series to a supply of electrical energy, and in running position connecting all the windings of the several pairs in series with each other and with the other pairs of windings to the same supply of electrical energy.

3. An alternating current motor comprising a field member having poles, an armature member relatively rotatable with respect thereto, shading coils encircling portions of said poles for at all times producing a displaced component of the flux therein, a starting winding on each pole and for producing a high starting flux density therein, and a running winding on each pole adapted, after the motor has been started, to be connected in series with said starting winding to produce in said pole a lower running flux density.

4. An alternating current motor comprising a field member having poles, an armature member relatively rotatable with respect thereto, shading coils encircling portions of said poles for at all times producing a displaced component of the flux therein, a starting winding on each pole, all said starting windings being connected in series to a supply of electrical energy to produce a high starting flux density in said poles, and a running winding on each pole, all of said running windings being connected in series with said starting windings and with each other to said supply of electrical energy after the motor has been started to produce a lower running flux density in said poles.

5. An alternating current motor comprising a field member having poles, an armature member relatively rotatable with respect thereto, shading coils encircling portions of said poles for at all times inducing a displaced component of the flux therein, a starting winding on each of said poles and connected in parallel to a supply of alternating electrical energy, and a running winding on each of said poles and adapted to be connected in series with said starting winding and to said supply of energy, said starting windings being proportioned with respect to said running windings to produce more flux in said poles when connected in parallel to a supply of electrical energy than is produced when said starting and running windings are connected in series thereto.

6. An alternating current motor comprising a field member having a plurality of poles, an armature member relatively rotatable with respect thereto, shading bands on each of said poles at all times inducing a component of the flux therein, a pair of windings surrounding each of said poles, and switch means having a starting position and a running position, for connecting in said starting position one winding on each of said poles in series to a supply of electrical energy and the other winding on each of said poles also in series to said supply of electrical energy and in parallel to the series of first-mentioned windings, and for connecting in said running position all of said windings in series to said supply of electrical energy.

SAMUEL E. SHEA.